(12) United States Patent
Kuwahara

(10) Patent No.: US 8,867,899 B2
(45) Date of Patent: Oct. 21, 2014

(54) PLAYBACK APPARATUS AND PLAYBACK METHOD

(75) Inventor: Kazuki Kuwahara, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 13/273,149

(22) Filed: Oct. 13, 2011

(65) Prior Publication Data

US 2012/0093484 A1  Apr. 19, 2012

(30) Foreign Application Priority Data

Oct. 15, 2010  (JP) .................................. 2010-233067

(51) Int. Cl.
| | |
|---|---|
| H04N 5/93 | (2006.01) |
| H04N 21/45 | (2011.01) |
| H04N 21/442 | (2011.01) |
| H04N 21/454 | (2011.01) |
| H04N 21/475 | (2011.01) |
| H04N 21/488 | (2011.01) |
| H04N 21/84 | (2011.01) |

(52) U.S. Cl.
CPC ..... *H04N 21/4532* (2013.01); *H04N 21/44222* (2013.01); *H04N 21/4542* (2013.01); *H04N 21/4755* (2013.01); *H04N 21/4882* (2013.01); *H04N 21/84* (2013.01)
USPC .......................................................... 386/262

(58) Field of Classification Search
CPC .................... H04N 21/44222; H04N 21/4532; H04N 21/84; H04N 21/4755; H04N 21/4882; H04N 21/4542
USPC ................................................ 386/261, 262
See application file for complete search history.

(56) References Cited

U.S. PATENT DOCUMENTS

| | | | | |
|---|---|---|---|---|
| 6,519,412 | B1 * | 2/2003 | Kim .............................. | 386/261 |
| 2002/0174430 | A1 | 11/2002 | Ellis et al. | |
| 2003/0014751 | A1 * | 1/2003 | Paek .............................. | 725/30 |
| 2003/0083533 | A1 * | 5/2003 | Gerba et al. .................. | 585/367 |
| 2006/0140584 | A1 | 6/2006 | Ellis et al. | |
| 2006/0218574 | A1 * | 9/2006 | Van Horck ...................... | 725/25 |

(Continued)

FOREIGN PATENT DOCUMENTS

| | | |
|---|---|---|
| JP | 2000134600 | 5/2000 |
| JP | 2007-043293 A | 2/2007 |

(Continued)

OTHER PUBLICATIONS

First Office Action mailed by Japan Patent Office on Dec. 20, 2011 in the corresponding to Japanese patent application No. 2010-233067 in 6 pages.

*Primary Examiner* — Thai Tran
*Assistant Examiner* — William Tran
(74) *Attorney, Agent, or Firm* — Knobbe Martens Olson & Bear LLP

(57) ABSTRACT

According to one embodiment, a playback apparatus includes a setting module, a detector, and a playback controller. The setting module is configured to set first limitation information configured to limit viewing of a person having an age lower than a first age. The detector is configured to detect second limitation information from a content including a plurality of programs, the second limitation information being configured to limit viewing of a person having an age lower than a second age set with respect to a first program included in the plurality of programs. The playback controller is configured to control playback of the content based on the first and second control information.

14 Claims, 5 Drawing Sheets

(56) References Cited

U.S. PATENT DOCUMENTS

| | | |
|---|---|---|
| 2008/0178210 A1* | 7/2008 | Casement et al. .............. 725/30 |
| 2008/0181574 A1 | 7/2008 | Ellis et al. |
| 2008/0184297 A1 | 7/2008 | Ellis et al. |
| 2009/0310937 A1 | 12/2009 | Ellis et al. |
| 2010/0031283 A1 | 2/2010 | Kageyama et al. |
| 2012/0072731 A1* | 3/2012 | Winograd et al. ............ 713/176 |
| 2012/0141096 A1 | 6/2012 | Ellis et al. |

FOREIGN PATENT DOCUMENTS

| | | |
|---|---|---|
| JP | 2008-301514 A2 | 12/2008 |
| JP | 2009-218844 A | 9/2009 |
| JP | 2010087816 | 4/2010 |
| JP | 2010098528 | 4/2010 |
| JP | 2010-124073 A | 6/2010 |
| JP | 2010-187202 A | 8/2010 |
| WO | WO 2004/045207 A1 | 5/2004 |

* cited by examiner

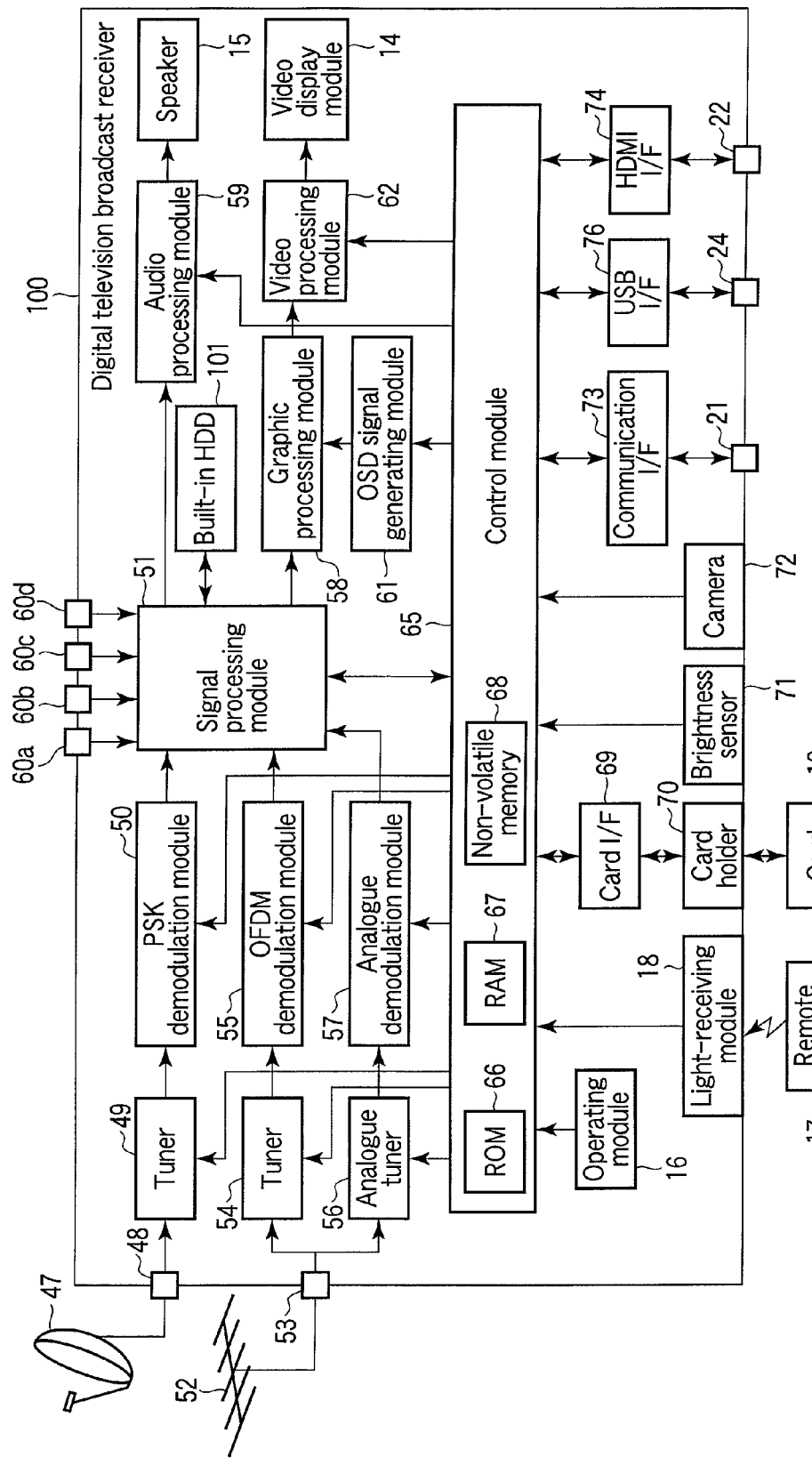
F I G. 1

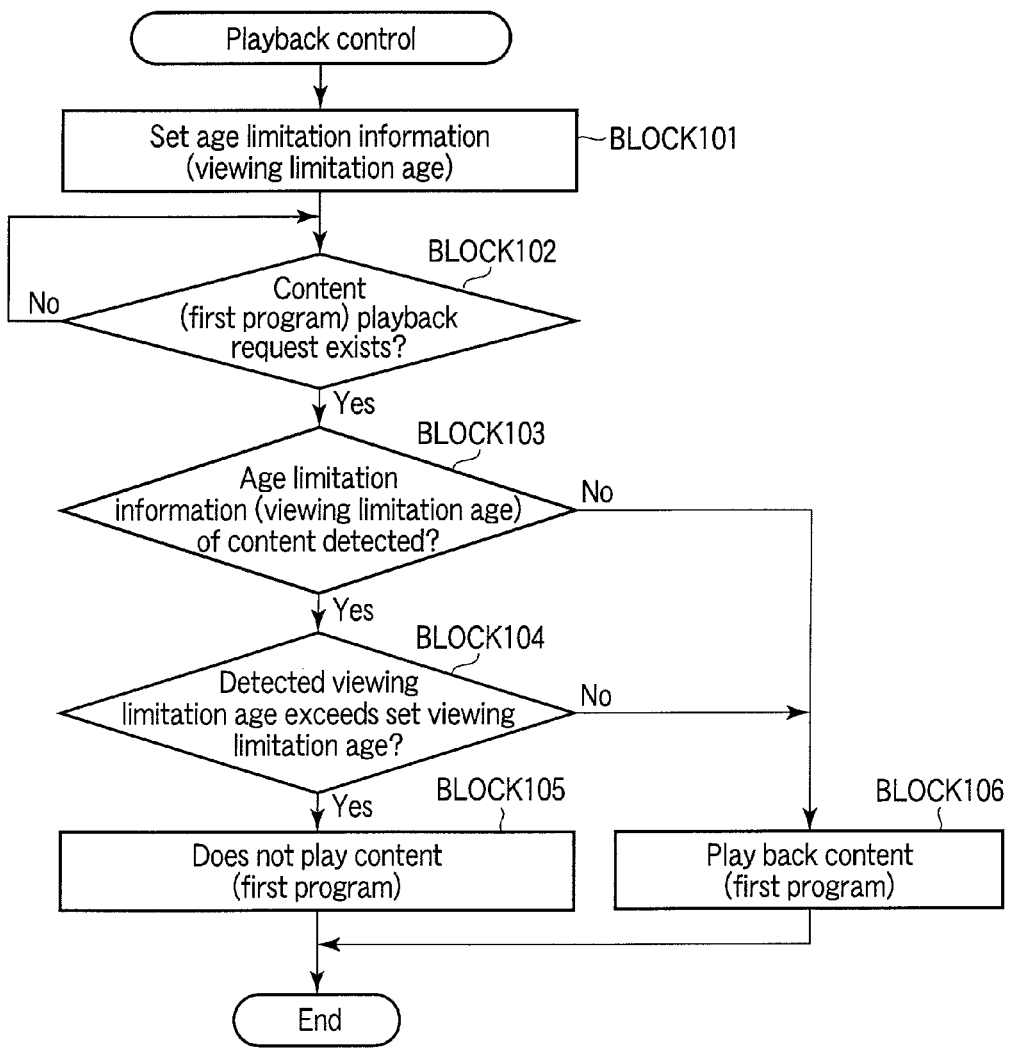
F I G. 2

FIG. 4

Moving image playback

Hard disc/ 🗁 //Current folder                                         5/30

|                | Total time |
|---|---|
| T1030580.avi | 01:02:34 |
| T1030582.avi | 01:55:46 |
| T1030585.avi | 02:20:23 |
| T1030588.avi | 01:05:19 |
| T1030592.avi | 02:30:10 |
| T1030596.avi | 02:02:56 |
| T1030600.avi | 01:55:46 |
| T1030612.avi | 02:20:23 |
| T1030624.avi | 01:05:19 |
| T1030630.avi | 02:02:56 |

Cannot be viewed due to age limitation

T1030592.avi
Updated time:2010/11/28

⬆⬇ Select  [Enter] Press

14
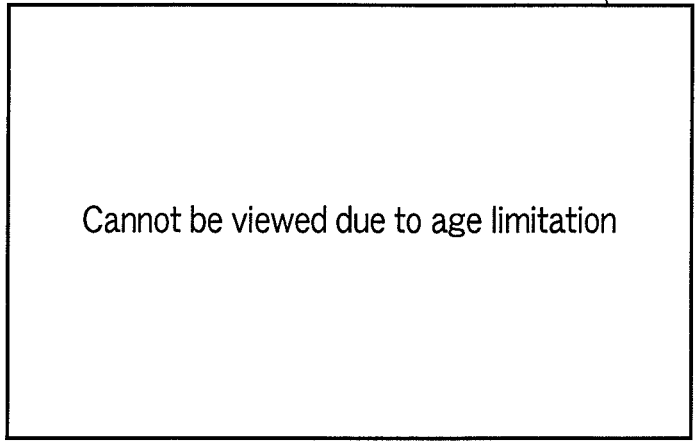
Cannot be viewed due to age limitation
F I G. 5

PLAYBACK APPARATUS AND PLAYBACK METHOD

CROSS-REFERENCE TO RELATED APPLICATIONS

This application is based upon and claims the benefit of priority from Japanese Patent Application No. 2010-233067, filed Oct. 15, 2010, the entire contents of which are incorporated herein by reference.

FIELD

Embodiments described herein relate generally to a playback apparatus and a playback method.

BACKGROUND

Recently, recorders capable of recording contents provided by satellite broadcast, for example, and contents distributed via networks, for example, have been prevalent. In recent years, digital television broadcast receivers capable of recording such contents have also become available.

In the above-described variety of contents provided, there exist harmful contents that include sexual expressions or violent expressions. For example, harmful contents include playback control information (parental lock). Upon detection of playback control information from a harmful content, for example, a content playback apparatus requests input of a password. On the condition that a registered password registered in advance and an input password input in response to the request agree, the content playback apparatus permits playback of the harmful content and plays back the harmful content.

In this way, the content playback apparatus limits playback of harmful contents. A variety of other techniques have also been proposed to limit playback of harmful contents.

When a harmful content is played back by the content playback apparatus, however, a password input operation is required even for the user who has permission to view the harmful content, which causes inconvenience.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an example of a configuration of a digital television broadcast receiver (playback apparatus), according to first and second embodiments;

FIG. 2 is a flowchart illustrating an example of playback control (playback suppression) according to the first embodiment;

FIG. 4 illustrates an example of a preview screen indicating that playback cannot be performed due to age limitation, according to the first and second embodiments; and FIG. 5 illustrates an example of a full screen indicating that playback cannot be performed due to age limitation, according to the first and second embodiments.

DETAILED DESCRIPTION

Figure 3:
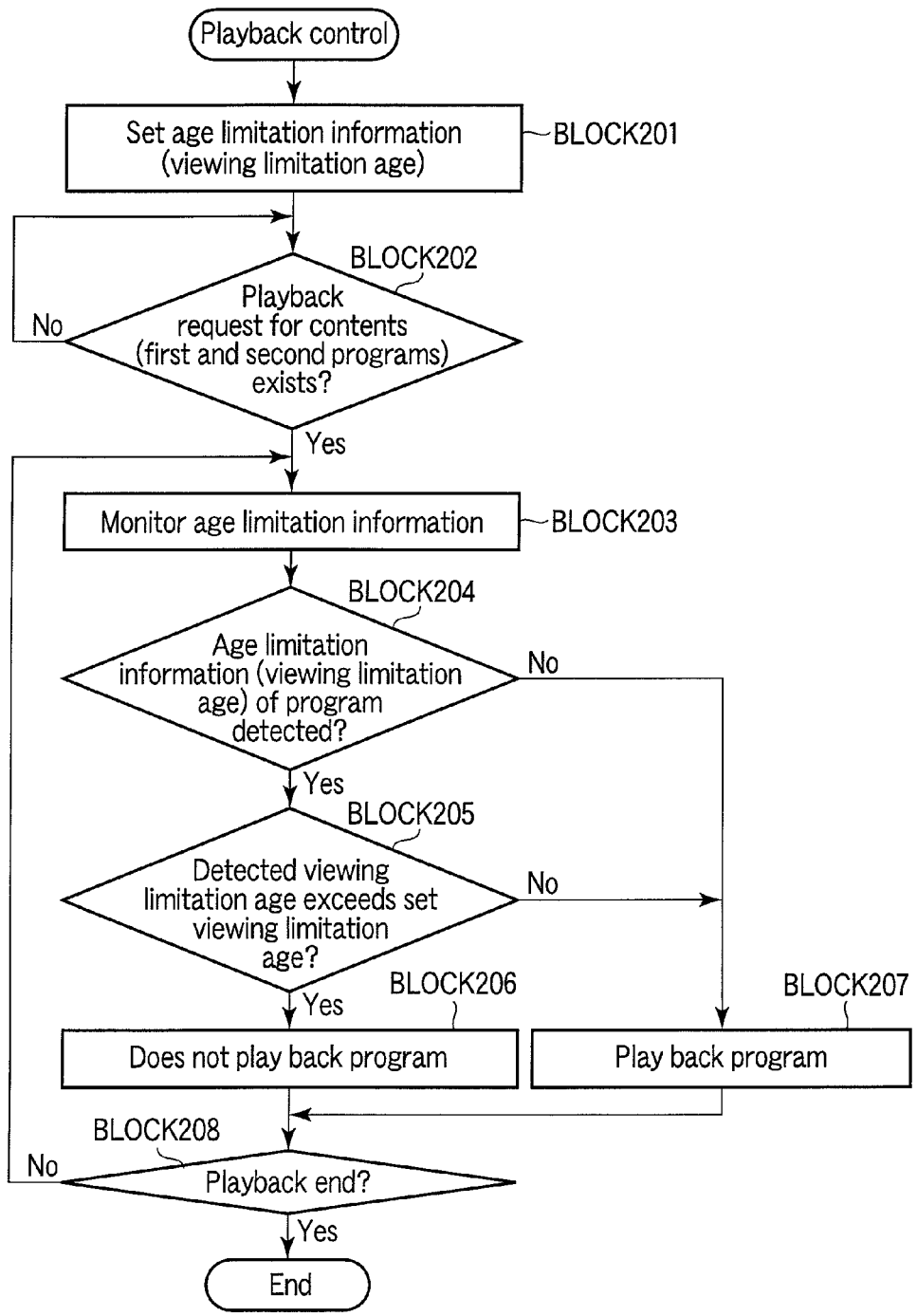
FIG. 3 is a flowchart illustrating an example of playback control (playback suppression) according to the second embodiment.

Various embodiments will be described hereinafter with reference to the accompanying drawings.

In general, according to one embodiment, a playback apparatus includes a setting module, a detector, and a playback controller. The setting module is configured to set first limitation information configured to limit viewing of a person having an age lower than a first age. The detector is configured to detect second limitation information from a content including a plurality of programs, the second limitation information being configured to limit viewing of a person having an age lower than a second age set with respect to a first program included in said plurality of programs. The playback controller is configured to control playback of the content based on the first and second control information.

Hereinafter, the first and second embodiments will be described with reference to the accompanying drawings.

FIG. 1 illustrates an exemplary configuration of a digital television broadcast receiver (playback apparatus) according to first and second embodiments. In the first and second embodiments, playback control of a digital television broadcast receiver will be described. However, the playback control is not limited to the one that is performed by the digital television broadcast receiver. The playback control may be embodied by a variety of recorders and players, as will be described below. The variety of recorders and players include HDD recorders, Blu-ray Disc (registered trademark) (BD) players, BD recorders, DVD players, and DVD recorders, for example.

Referring to FIG. 1, a digital television broadcast receiver 100 will be described. As shown in FIG. 1, a satellite digital television broadcast signal received via an antenna 47 for BS/CS digital broadcast reception is supplied to a tuner 49 for satellite digital broadcast via an input terminal 48, and the tuner 49 selects a broadcast signal of a specified channel.

The broadcast signal selected by the tuner 49 is supplied to a phase shift keying (PSK) demodulation module 50, demodulated into digital video signal and audio signal, and then output to a signal processing module 51.

Further, a digital terrestrial television broadcast signal received via an antenna 52 for terrestrial broadcast reception is supplied to a tuner 54 for digital terrestrial broadcasting via an input terminal 53, and the tuner 54 selects a broadcast signal of the specified channel.

The broadcast signal selected by the tuner 54 is supplied to an orthogonal frequency-division multiplexing (OFDM) demodulation module 55, demodulated into digital video signal and audio signal, and then output to the signal processing module 51.

An analogue terrestrial television broadcast signal received via the antenna 52 for terrestrial broadcast reception is supplied to a tuner 56 for analogue terrestrial broadcasting via the input terminal 53, and the tuner 56 selects a broadcast signal of the specified channel. Further, the broadcast signal selected by the tuner 56 is supplied to an analogue demodulation module 57 and demodulated into analogue video signal and audio signal, and then output to the signal processing module 51.

In this case, the signal processing module 51 selectively performs a predetermined digital signal processing on the digital video signal and audio signal supplied from the PSK demodulation module 50 and the OFDM demodulation module 55, respectively, and output the processed signals to a graphics processing module 58 and an audio processing module 59.

A plurality of (4 in the case of FIG. 1) input terminals 60a, 60b, 60c, 60d are connected to the signal processing module 51. These input terminals 60a-60d are designed to allow analogue video signals and audio signals to be input from outside the digital television broadcast receiver 100.

The signal processing module 51 selectively digitalizes the analogue video signals and audio signals supplied from the analogue demodulation module 57 and the input terminals 60a-60d, subjects a predetermined digital signal processing to the digitalized video signals and audio signals, and then output the processed signals to the graphic processing module 58 and the audio processing module 59.

The graphic processing module 58 has a function of superimposing an OSD signal generated by an on-screen display (OSD) signal generation module 61 on the digital video signal supplied from the signal processing module 51 and outputting the superimposed signal. The graphic processing module 58 is capable of selectively outputting the output video signal of the signal processing module 51 and the output OSD signal of the OSD signal generation module 61, and outputting the both outputs in combination.

Further, the digital video signal output from the graphic processing module 58 is supplied to a video processing module 62. The video signal processed by the video processing module 62 is supplied to the video display module 14, and also supplied to an output terminal 63. The video display module 14 displays a video based on the video signal, and when an external device is connected to an output terminal 63, the video signal supplied to the output terminal 63 is input to the external device.

The audio processing module 59 converts the input digital audio signal into an analogue audio signal that can be played back by the speaker 15, and then output to the speaker 15 as a voice and let it exit outside via the output terminal 64.

The control module 65 of the digital television broadcast receiver 100 collectively controls all the processes and operations including the above-described signal processing, for example. The control module 65 is formed of a central processing unit (CPU), for example. The control module 65 controls each module based on operation information from the operation module 16 or operation information transmitted by the remote controller 17 and received via a light-receiving portion 18, such that the operation is reflected.

In this case, the control module 65 mainly uses a read-only memory (ROM) 66 configured to store a control program executed by the CPU, a random access memory (RAM) 67 configured to provide the CPU with a work area, and a non-volatile memory 68 configured to store setting information and control information of various kinds, for example.

Further, the control module 65 is connected to a card holder 70, into which a memory card 19 can be inserted, via a card interface (I/F) 69. Thereby, the control module 65 is capable of transferring information via the card I/F 69 to and from the memory card 19 attached to the card holder 70.

The control module 65 is connected to a LAN terminal 21 via a communication I/F 73. Thereby, the control module 65 is capable of transmitting and receiving information via a LAN cable connected to the LAN terminal 21 and the communication I/F 73. For example, the control module 65 is capable of receiving a content distributed by a server via the LAN cable and the communication I/F 73.

Further, the control module 65 is connected to the HDMI terminal 22 via an HDMI I/F 74. Thereby, the control module 65 is capable of transferring information to and from an HDMI-compliant device connected to the HDMI terminal 22 via the HDMI I/F 74.

Further, the control module 65 is connected to a USB terminal 24 via a USB I/F 76. Thereby, the control module 65 is capable of transferring information to and from a USB-compliant device connected to the USB terminal 24 via the USB I/F 76.

Further, the control module 65 refers to scheduled recording information included in a scheduled recording list stored in the non-volatile memory 68, and controls the recording operation of the content based on the received signal. The recordings are stored into an integrated HDD 101, a USB-HDD 102, or the like.

Further, the control module 65 controls brightness of the backlight of the video display module 14 based on a brightness detection level supplied from a brightness sensor 71. Further, the control module 65 judges whether a uses exists in a position opposite to the video display module 14 based on moving image information from a camera 72, and controls the video of the video display portion 14 to be turned on and off.

Next, an example of playback control of a content including playback control information performed by the digital television broadcast receiver 100 will be described.

(First Embodiment)

An example of playback control (playback suppression) according to the first embodiment will be described with reference to the flowchart shown in FIG. 2.

In the first embodiment, a case will be described where one content (which will be hereinafter referred to as a first content) corresponds to one program (which will be hereinafter referred to as a first program), and the digital television broadcast receiver 100 plays back the first content. For example, the first content including the first program is a content received via tuners 49, 54, or a communication I/F 73. Further, the first content includes playback control information (parental information) set with respect to the first program.

The user is capable of inputting age limitation information (which will be hereinafter referred to as first age limitation information) via an operation module 16 or a remote controller 17, and the operation module 16 or the remote controller 17 sets the first age limitation information in response to input of the first age limitation information (BLOCK101). The first age limitation information is information designed to limit viewing of a person having an age lower than a first age. For example, a non-volatile memory 68 stores the set first age limitation information.

The non-volatile memory 68 stores a registered password set in advance, and the control module 65 requests input of the password in response to a request of input and change of the first age limitation information. In response thereto, the user inputs a password via the operation module 16 or the remote controller 17, and the control module 65 permits input and change of the first age limitation information under the condition that the registered password and the input password agree, and set new first age limitation information or change the set first age limitation information.

Next, the user is capable of requesting playback of the first content via the operation module 16 or the remote controller 17. For example, when the user selects a device to which the video is input, selects a channel, and requests playback of a first content provided by the selected channel via the operation module 16 or the remote controller 17, the control module 65 judges whether it is possible to play back the first content provided by the selected channel. Alternatively, when the user indicates display of a list of a plurality of contents stored in an integrated HDD 101 via the operation module 16 or the remote controller 17, selects the first content from a plurality of contents displayed as a list, and requests playback of the first content, the control module 65 judges whether it is possible to play back the selected first content.

Upon receipt of a request for playback of the fist content (BLOCK102), the control module 65 detects playback control information from the first content, and detects age limitation information (which will be hereinafter referred to as second age limitation information) set in a first program from playback control information (BLOCK103, YES). The control module 65 controls (suppresses) playback of a first content (first program) based on the set first age limitation information and the detected second age limitation information. The second age limitation information is information designed to limit viewing of a person having an age lower than a second age.

For example, when the second age of the second age limitation information exceeds the first age of the first age limitation information (BLOCK104, YES), the control module 65 denies playback of the first content (first program), and does not play back the first content (first program) (BLOCK105). For example, the control module 65 denies preview playback, in which the first program is played back in a first screen size (small screen), and denies normal playback, in which the first program is played back in a second screen size (full screen) greater than the first screen size, either.

Further, the control module 65 instructs output of playback impossible information indicating that the first content will not be played back due to age limitation, and an OSD signal generation module 61 outputs playback impossible information in response thereto. For example, when the user selects an item or icon indicating existence of the first content via the operation module 16 or the remote controller 17, the video display module 14 displays the playback impossible information on a small screen, as shown in FIG. 4, for example. Further, even when the user selects an item or an icon indicating existence of the first program and specifies playback of the first program via the operation module 16 or the remote controller 17, the video display module 14 displays the playback impossible information on the full screen, as shown in FIG. 5, for example.

Further, when the second age of the second age limitation information does not exceed the first age of the first age limitation information (BLOCK104, NO), the control module 65 permits playback of the first content (first program), and plays back the first content (first program) (BLOCK106).

Further, even when the control module 65 cannot detect age limitation information from the playback control information of the first content (BLOCK103, NO), the control module 65 permits playback of the first content (first program) and plays back the first content (first program) (BLOCK106).

(Second Embodiment)

In the second embodiment, a case will be described where one content (which will be hereinafter referred to as a first content) corresponds to a plurality of programs (first and second programs, for example) and a digital television broadcast receiver 100 plays back the first content. For example, the first content including the first and second programs is a content received via tuners 49, 54 or a communication I/F 73. The first content includes first playback control information (first parental information) set with respect to the first program, and second playback control information (second parental information) set with respect to the second program.

The first content includes the first and second programs in a case as will be described below.

First, the case of time specification recording will be described. For example, when the user instructs time specification recording via the operation module 16 or the remote controller 17, and inputs a record start time, a record end time, and a record channel via the operation module 16 or the remote controller 17, the control module 65 sets program record information (record start time, record end time, and record channel) in the non-volatile memory 68. For example, the control module 65 sets the record start time as October 1, AM 9:00, the record end time as October 1, AM 11:00, and the record channel as Channel 200. In Channel 200, the first program is provided during AM 9:00-10:00 of October 1, and the second program is provided during AM 9:00-10:00 of October 1. In this case, the control module 65 records the first content including Program A and Program B into the integrated HDD 101.

After that, a case of editing process will be described. For example, when the user instructs an editing process via the operation module 16 or the remote controller 17 and instructs a combining process of combining the first and second programs stored in the integrated HDD 101, via the operation module 16 or the remote controller 17, the control module 65 generates a first content including the first and second programs in the integrated HDD 101.

The user is capable of inputting age limitation information (which will be hereinafter referred to as first age limitation information) via the operation module 16 or the remote controller 17, and the operation module 16 or the remote controller 17 sets the first age limitation information in response to input of the first age limitation information. The first age limitation information is information designed to limit viewing of a person having an age lower than the first age. For example, the non-volatile memory 68 stores the set first age limitation information.

Next, the user is capable of requesting playback of the first content via the operation module 16 or the remote controller 17. For example, when the user selects a device to which the video is input and selects a channel via the operation module 16 or the remote controller, and requests playback of the first content provided by the selected channel, the control module 65 judges whether it is possible to play back the first content provided by the selected channel. Alternatively, when the user instructs display of a list of a plurality of contents stored in the integrated HDD 101 via the operation module 16 or the remote controller 17, selects the first content from a plurality of contents displayed as a list, and requests playback of the first content, the control module 65 judges whether it is possible to play back the selected first content.

The control module 65 detects the fist playback control information from the first content, detects age limitation information (which will be hereinafter referred to as second age limitation information) set in the first program from the first playback control information, and controls (suppresses) playback of the first content (first program) based on the set first age limitation information and detected second age limitation information. It is to be noted that the second age limitation information is information designed to limit viewing of a person having an age lower than the second age.

Further, the control module 65 detects second playback control information from the first content, detects age limitation information (which will be hereinafter referred to as third age limitation information) set in the second program from the second playback control information, and controls (suppresses) playback of the first content (second program) based on the detected third age limitation information. The third age limitation information is information designed to limit viewing of a person having an age lower than a third age.

When the second age of the second age limitation information exceeds the first age of the first age limitation information, the control module 65 denies playback of the first program, and does not play back the second program. For example, the control module 65 denies preview playback, in which the first program is played back in a first screen size (small screen), and denies normal playback, in which the first program is played back in a second screen size (full screen) greater than the first screen size, either.

When the third age of the third age limitation information exceeds the first age of the first age limitation information, the control module 65 denies playback of the second program, and does not play back the first program. For example, the control module 65 denies preview playback, in which the second program is played back in a first screen size (small screen), and denies normal playback, in which the second program is played back in a second screen size (full screen) greater in size than the first screen size, either.

Further, when the second age exceeds the first age and the third age does not exceed the first age, the control module 65 skips playback of the first program and starts playback from the second program. For example, when the user selects an item or an icon indicating existence of a first content via the operation module 16 or the remote controller 17, the video display module 14 displays playback impossible information indicating that the first program will not be played back due to age limitation, and a playback video of the second program is displayed on the small screen after a predetermined period of time has elapsed. Further, when the user specifies playback of the first content from an item or an icon indicating existence of the first content via the operation module 16 or the remote controller 17, the video display module 14 displays playback impossible information indicating that the first program will not be played back due to age limitation on the full screen, and displays a playback video of the second program after a predetermined period of time has elapsed.

Alternatively, when the second age exceeds the first age and the third age does not exceed the first age, the control module 65 may deny playback of the first content (deny playback of both the first and second programs) and not play back the first content (both the first and second programs). In this case, when the user selects an item or an icon indicating existence of the first content via the operation module 16 or the remote controller 17, the video display module 14 displays playback impossible information indicating that the first content (first and second programs) will not be played back due to age limitation on the small screen. Further, when the user specifies playback of the first content from an item or an icon indicating existence of the first content via the operation module 16 or the remote controller 17, the video display module 14 displays playback impossible information indicating that the first content (first and second programs) will not be played back due to age limitation on the full screen.

Further, when the second age does not exceed the first age, the control module 65 permits playback of the first program, and plays back the first program. Thereby, the video display module 14 displays a video corresponding to the first program. Further, when the third age does not exceed the first age, or when the third age limitation information is not detected, the control module 65 permits the second program, and plays back the second program. Thereby, the video display module 14 displays a video corresponding to the second program.

Further, the control module 65 may be configured to acquire second age limitation information set with respect to the first program at timing at which the first program included in the first content is played back, control (suppresses) playback of the first program based on the first age limitation information and the second age limitation information, acquire third age limitation information set with respect to the second program at timing at which the second program included in the first content is played back, and control (suppress) playback of the second program based on the first age limitation information and the third age limitation information.

Next, an example of playback control according to the second embodiment will be described with reference to the flowchart shown in FIG. 3. The playback control that will be described below is applicable to streaming playback of the first content including the first and second programs, for example.

As described above, the user is capable of inputting the first age limitation information via the operation module 16 or the remote controller 17, and the operation module 16 or the remote controller 17 sets the first age limitation information in response to input of the first age limitation information (BLOCK201).

Upon receipt of a request for playback of the fist content (BLOCK202), the control module 65 starts monitoring the age limitation information included in the first content (BLOCK203), detects the second age limitation information set in the first program included in the first content (BLOCK204, YES), and when the second age of the second age limitation information exceeds the first age of the first age limitation information (BLOCK205, YES), denies playback of the first program and does not play back the first program (BLOCK206). Further, when the second age does not exceed the first age (BLOCK205, NO), the control module 65 permits playback of the first program, and plays back the first program (BLOCK207). Further, when the control module 65 cannot detect the second age limitation information set in the first program (BLOCK104, NO), the control module 65 permits playback of the first program and plays back the first program (BLOCK207).

When the control module 65 does not detect a playback end instruction of the first content (BLOCK208, NO), the control module 65 continues to monitor the age limitation information included in the first content (BLOCK203), detects the third age limitation information set in the second program included in the first content (BLOCK204, YES), and when the third age of the third age limitation information exceeds the first age of the first age limitation information (BLOCK205, YES), denies playback of the second program and does not play back the second program (BLOCK206). Further, when the third age does not exceed the first age (BLOCK205, NO), the control module 65 permits playback of the second program, and plays back the second program (BLOCK207). Further, even when the control module 65 cannot detect the third age limitation information set in the second program (BLOCK204, NO), the control module 65 permits playback of the second program, and plays back the second program (BLOCK207).

The above-described playback control is also applicable to playlist playback of the digital television broadcast receiver 100. For example, the control module 65 registers a plurality of programs (first and second programs, for example) specified in advance as a playlist, and continually plays back the programs based on the playlist (playlist playback). During the playlist playback, the control module 65 monitors age limitation information set with respect to each program registered in the playlist and controls playback of each program.

The above-described first and second embodiments will be summarized below.

Recently, viewing age limitation control is set in some broadcasting programs (sexually explicit contents, for example). Further, there is an increasing number of recorders equipped with a digital media server (DMS) function of receiving a viewing age limitation program via a LAN and record the received program. The recorder is capable of playing back the recorded viewing age limitation program using a digital media player (DMP) function. Further, the recorder may output display information used to display titles of distributed contents as a list. In response thereto, a display module of a TV, for example, displays titles, for example, of the distributed contents as a list. When a title of one content is selected from the displayed list, the recorder plays back the content corresponding to the selected title. When users A and B share one recorder, however, there may be a case where the user A records a viewing age limitation program and does not want the user B (child, for example) to see the age limitation program. Further, there may be a case where the user A records a viewing age limitation program and does not want the user B to view the viewing age limitation program. In short, the user A wants to limit playback of the viewing age limitation program.

The digital television broadcast receiver 100 described above in the first and second embodiments is equipped with a function of inquiring the server of playback of a content distributed by the server or a content instructed by a digital media controller (DMC), acquires parental information in a stream of the content to be played back, compares viewing age limitation set in advance with the viewing age limitation included in the acquired parental information, and when the viewing age limitation included in the parental information exceeds the viewing age limitation set in advance, playback of the content to be played back is suppressed, i.e., the content is not played back, for example.

According to at least one of the above-described embodiments, it is possible to provide a playback apparatus and a playback method excellent in playback control of a content including playback control information.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A playback apparatus comprising:
    a setting module configured to set first limitation information configured to limit viewing by a person having an age lower than a first age;
    a recorder configured to select a predetermined channel from a record start time to a record end time based on a record start time setting, a record end time setting, and a predetermined channel setting, and to record a first program broadcast on the selected predetermined channel and a second program following the first program as an integrated content including the recorded first program and the recorded second program;
    a detector configured to detect second limitation information and third limitation information from the integrated content, the second limitation information being configured to limit viewing by a person having an age lower than a second age set with respect to the first program, and the third limitation information being configured to limit viewing by a person having an age lower than a third age set with respect to the second program;
    a playback controller configured to skip playback of the first program and start playback from the second program in response to a playback instruction of the integrated content with a playback impossible judgment of the first program based on the second age exceeding the first age and a playback possible judgment of the second program based on the-third age not exceeding the first age; and
    a video display device comprising a first display area configured to display an icon or other item indicating existence of the integrated content associated with the playback instruction, and a second display area distinct from the first display area configured to start displaying playback impossible information indicating that the first program will not be played back and to continue displaying video of the second program after a period of time has elapsed, in response to the playback instruction and in accordance with the second age exceeding the first age and the third age not exceeding the first age, wherein the first display area and the second display area are configured to display simultaneously.

2. The apparatus of claim 1, further comprising:
    an information output module configured to output playback impossible information indicating that the first program will not be played back due to an age limitation in response to the playback instruction of the integrated content and the playback impossible judgment of the first program.

3. The apparatus of claim 2, wherein the information output module is configured to start playback from the second program after outputting the playback impossible information.

4. The apparatus of claim 1, wherein the playback controller is configured to start playback from the first program and to limit playback of the second program in response to the playback instruction of the integrated content in accordance with a playback possible judgment of the first program based on the first and second limitation information and a playback impossible judgment of the second program based on the first and third limitation information.

5. The apparatus of claim 1, wherein the playback controller is configured to make the playback impossible judgment of the first program when the second age exceeds the first age.

6. The apparatus of claim 4, wherein the playback controller is configured to make the playback impossible judgment of the second program when the third age exceeds the first age.

7. The apparatus of claim 1, wherein the playback controller is configured to play back the first program when the second age does not exceed the first age, and to play back the second program following the playback of the first program when the third age does not exceed the first age.

8. The apparatus of claim 1, wherein the playback controller is configured to play back the first program when the second limitation information is not detected, and to play back the second program following the playback of the first program when the third limitation information is not detected.

9. A playback apparatus comprising:
    a setting module configured to set first limitation information configured to limit viewing by a person having an age lower than a first age;
    an editing module configured to edit a first program and a second program as an integrated content including the recorded first program and the recorded second program;
    a detector configured to detect second limitation information and third limitation information from the edited integrated content, the second limitation information being configured to limit viewing by a person having an age lower than a second age set with respect to the first program, and the third limitation information being configured to limit viewing by a person having an age lower than a third age set with respect to the second program;

a playback controller configured to skip playback of the first program and start playback from the second program in response to a playback instruction of the edited integrated content in accordance with a playback impossible judgment of the first program based on the second age exceeding the first age and a playback possible judgment of the second program based on the-third age not exceeding the first age; and a video display device comprising a first display area configured to display an icon or other item indicating existence of the edited integrated content associated with the playback instruction, and a second display area distinct from the first display area configured to start displaying playback impossible information indicating that the first program will not be played back and to continue displaying video of the second program after a period of time has elapsed, in response to the playback instruction and in accordance with the second age exceeding the first age and the third age not exceeding the first age, wherein the first display area and the second display area are configured to display simultaneously.

10. The apparatus of claim 9, wherein the playback controller is configured to deny preview playback of the first program, in which the first program is played back in a first screen size, and to deny normal playback of the first program, in which the first program is played back in a second screen size greater than the first screen size, when the second age exceeds the first age.

11. The apparatus of claim 9, wherein the playback controller is configured to deny preview playback of the second program, in which the second program is played back in a first screen size, and to deny normal playback of the second program, in which the second program is played back in a second screen size greater than the first screen size, when the third age exceeds the first age.

12. The apparatus of claim 1, wherein the playback controller is configured to deny preview playback of the first program, in which the first program is played back in a first screen size, and to deny normal playback of the first program, in which the first program is played back in a second screen size greater than the first screen size, when the second age exceeds the first age.

13. The apparatus of claim 1 wherein the playback controller is configured to deny preview playback of the second program, in which the second program is played back in a first screen size, and to deny normal playback of the second program, in which the second program is played back in a second screen size greater than the first screen size, when the third age exceeds the first age.

14. A playback method, comprising:

setting first limitation information configured to limit viewing by a person having an age lower than a first age;

selecting a predetermined channel from a record start time to a record end time based on a record start time setting, a record end time setting, and a predetermined channel setting;

recording a first program broadcast on the predetermined channel and a second program following the first program as an integrated content including the recorded first program and the recorded second program;

detecting second limitation information and third limitation information from the integrated content, the second limitation information being configured to limit viewing by a person having an age lower than a second age set with respect to the first program, and the third limitation information being configured to limit viewing by a person having an age lower than a third age set with respect to the second program;

skipping playback of the first program and starting playback from the second program in response to a playback instruction of the integrated content in accordance with a playback impossible judgment of the first program based on the second age exceeding the first age and a playback possible judgment of the second program based on the-third age not exceeding the first age; and displaying an icon or other item indicating existence of the integrated content associated with the playback instruction in a first display area of a video display device, starting displaying, in a second display area of the a video display device, playback impossible information indicating that the first program will not be played back and continuing displaying video of the second program in the second display area after a period of time has elapsed, in response to the playback instruction and in accordance with the second age exceeding the first age and the third age not exceeding the first age, wherein the first display area is distinct from the first display area, and wherein the first display area and the second display area are configured to display simultaneously.

* * * * *